(12) United States Patent
Aebersold et al.

(10) Patent No.: US 7,854,174 B2
(45) Date of Patent: Dec. 21, 2010

(54) MEMS CAPACITIVE BENDING AND AXIAL STRAIN SENSOR

(75) Inventors: Julia W. Aebersold, Floyds Knob, IN (US); Kevin Walsh, Louisville, KY (US); Mark Crain, Georgetown, IN (US); Michael Voor, Louisville, KY (US)

(73) Assignee: OrthoData Technologies LLC, Louisville, KY (US)

( * ) Notice: Subject to any disclaimer, the term of this patent is extended or adjusted under 35 U.S.C. 154(b) by 0 days.

(21) Appl. No.: 12/393,294

(22) Filed: Feb. 26, 2009

(65) Prior Publication Data

US 2009/0188325 A1 Jul. 30, 2009

Related U.S. Application Data

(63) Continuation of application No. 11/552,547, filed on Oct. 25, 2006, now Pat. No. 7,509,870.

(60) Provisional application No. 60/730,087, filed on Oct. 26, 2005.

(51) Int. Cl.
*G01L 1/14* (2006.01)

(52) U.S. Cl. ............................ 73/780; 73/775; 73/777

(58) Field of Classification Search .................. 73/775, 73/777, 778, 779, 780, 862.626
See application file for complete search history.

(56) References Cited

U.S. PATENT DOCUMENTS

| | | | |
|---|---|---|---|
| 4,188,651 A | 2/1980 | Dornfeld et al. |
| 4,941,363 A | 7/1990 | Doemens et al. |
| 5,491,604 A | 2/1996 | Nguyen et al. |
| 5,537,083 A | 7/1996 | Lin et al. |
| 5,610,528 A | 3/1997 | Neely et al. |
| 5,723,353 A | 3/1998 | Muenzel et al. |
| 5,750,904 A | 5/1998 | Doemens et al. |
| 5,827,980 A | 10/1998 | Doemens et al. |
| 5,839,062 A | 11/1998 | Nguyen et al. |
| 5,918,280 A | 6/1999 | Gang et al. |

(Continued)

OTHER PUBLICATIONS

Silver Conductive Epoxy. Catalog #8331-14G. Product sheet accessed online at <www.mgchemicals.com/products/8331.html>. Published online on Jul. 21, 2004.*

(Continued)

*Primary Examiner*—Lisa M Caputo
*Assistant Examiner*—Punam Roy
(74) *Attorney, Agent, or Firm*—Frost Brown Todd LLC

(57) ABSTRACT

A three-dimensional micro-electro-mechanical-systems (MEMS) capacitive bending and axial strain sensor capacitor is described. Two independent comb structures, incorporating suspended polysilicon interdigitated fingers, are fabricated simultaneously on a substrate that can displace independently of each other while attached to a substrate undergoing bending or axial deformation. A change in spacing between the interdigitated fingers will output a change in capacitance of the sensor and is the primary mode of operation of the device. On the bottom and to the end of each comb structure, a glass pad is attached to the comb structure to allow for ample surface area for affixing the sensor to a substrate. During fabrication, tethers are used to connect each comb structure to maintain equal spacing between the fingers before attachment to the substrate. After attachment, the tethers are broken to allow independent movement of each comb structure.

5 Claims, 9 Drawing Sheets

U.S. PATENT DOCUMENTS

| | | |
|---|---|---|
| 5,955,932 A | 9/1999 | Nguyen et al. |
| 6,236,281 B1 | 5/2001 | Nguyen et al. |
| 6,266,226 B1 | 7/2001 | Hayashi |
| 6,532,824 B1 | 3/2003 | Ueno et al. |
| 6,606,913 B1 | 8/2003 | Gianchandani |
| 6,629,461 B2 | 10/2003 | Behin et al. |
| 6,914,323 B2 | 7/2005 | Curtis et al. |
| 7,035,083 B2 | 4/2006 | Lin et al. |
| 7,085,122 B2 | 8/2006 | Wu et al. |
| 2002/0092340 A1 | 7/2002 | Prater et al. |
| 2004/0183177 A1 | 9/2004 | Curtis et al. |

OTHER PUBLICATIONS

Gianchandani, Y.B. et al., "Bent-Beam Strain Sensors," Journal of Microelectromechanical Systems, vol. 5(1)(Mar. 1996) pp. 52-58.

Guo, J. et al., "Buckled Beam Linear Output Capacitive Strain Sensor," Solid-State Sensor, Actuator and Mircrosystems Workshop, Hilton Head Island, USA (Jun. 6-10, 2004) pp. 344-347.

"Micromachined Devices and Fabrication Technologies," J. Webster (ed.), Wiley Encyclopedia of Electrical and Electronics Engineering, John Wiley & Sons, Inc. (1999) pp. 648-665.

* cited by examiner

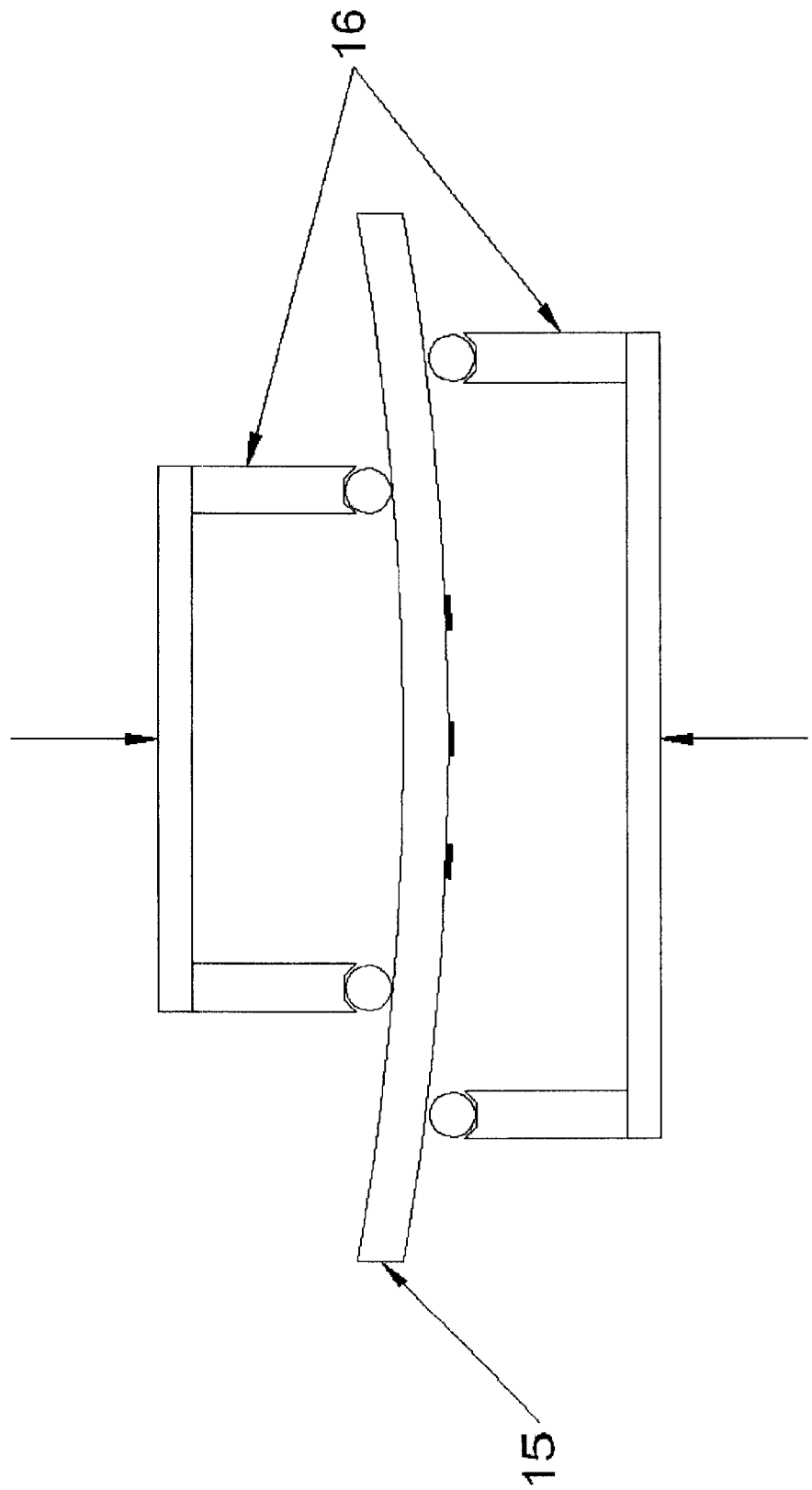

MEMS CAPACITIVE BENDING AND AXIAL STRAIN SENSOR

CROSS-REFERENCE TO RELATED APPLICATIONS

This application is a continuation of non-provisional patent application Ser. No. 11/552,547, of the same title filed 2006 Oct. 25 by the present inventors, the disclosure of which is hereby incorporated by reference herein in its entirety, and which claims the benefit of provisional patent Appl. No. 60/730,087, of the same title filed 2005 Oct. 26 by the present inventors, the disclosure of which is also hereby incorporated by reference in its entirety.

FEDERALLY SPONSORED RESEARCH

This invention was made with government assistance provided by the National Science Foundation under Contract No. BES-0097521. The government has certain rights to this invention.

BACKGROUND OF THE INVENTION

1. Field of Invention

This invention relates to a strain sensor, specifically to a sensor that can measure axial and bending strain.

2. Background of the Invention

Variable capacitors play a fundamental role in high-frequency and radio-frequency (RF) circuits. In the last few years, MEMS variable capacitors have drawn considerable interest due to their superior electrical characteristics, size and cost of manufacture.

While variable capacitors using MEMS technology can be readily implemented in standard semiconductor devices for applications in aerospace, consumer electronics and communications systems, researchers have attempted to provide application to medical systems or diagnostics. Modern medical science has emerged with a need to monitor physiological functions (i.e. intravascular pressure, intraocular pressure, etc.). A variety of these monitoring devices require that their tasks be performed wirelessly and implanted for indefinite terms to allow for patient mobility, continuance of daily activities and avoidance of costly surgeries to remove the systems after utilization is complete.

An application of a MEMS bending and axial capacitive sensor is to monitor strain changes of spinal instrumentation implanted during spinal fusion surgical procedures to assist orthopaedic surgeons with evaluation of fusion progression. The current method to assess fusion is the evaluation of radiographic images. However, image obstructions often prevent a clear determination if fusion has occurred. A strain sensor could be incorporated with a battery-less implantable telemetry system and enclosed in a hermetically sealed package. After attachment to the spinal instrumentation, the sensor can vary its capacitance output due to small changes in strain by the instrumentation as fusion occurs, thereby giving objective data to the orthopaedic surgeons of whether fusion is occurring and potentially avoiding costly exploratory surgery.

Existing strain sensors are used to indicate the amount and the type of deformation (i.e. elongation or compression) of materials. These can be used to indicate the state of a material, predict material behavior or gather material properties. These types of sensors can gather information in a variety of manners including changes in resistance and capacitance. However, there has not been a sensor available that can measure bending and axial strain in a capacitive manner.

Inventors have developed sensors in attempts to measure bending strain in a capacitive manner. U.S. Pat. No. 5,827,980 to Doemens (1998) has developed a dual comb structure; however, the orientation of the device is situated at 45 degrees and is not meant to observe bending strain. Additionally by Doemens, U.S. Pat. No. 5,750,904 (1998) the inventor has proposed a dual pair of comb structures that primarily measure axial forces or extension forces. However, bending is not the primary method of actuation which would cause the comb structures to move vertically causing a change in the overlapping surface area.

U.S. Pat. No. 6,606,913 to Gianchandani (2003) has disclosed a complex array of elevated small comb structures or tines with vertical sidewalls. While undergoing axial strain, the tines will change their overlapping surface area, which can be correlated to change in capacitance and strain. However, due to the attachment method of securing both ends of the comb structures to the substrate, the sensor would not be able to actuate while undergoing bending strain. A similar case is made with U.S. Pat. No. 7,035,083 to Lin (2006), where the attachment method of the tines will not allow vertical displacement allowing a change in the overlapping surface area of the tines.

Other U.S. Pat. Nos. 4,188,651 (1980), 4,941,363 (1990), 5,610,528 (1997), 6,266,226 (2001) and 6,532,824 (2003) identify capacitive comb structures comprised on a thin film. However, the lack of vertical dimension or overlapping surface area can not be used to determine the amount of bending strain present in a deformed substrate.

Comb structures are prolific throughout the MEMS environment; however, very few are actuated by attachment via a substrate. Most examples are actuated by the electrostatic means of applying a voltage potential to the independent comb structures as noted by Wu, U.S. Pat. No. 7,085,122 (2006), Lin, U.S. Pat. No. 5,537,083 (1996), Gang, U.S. Pat. No. 5,918,280 (1999), Muenzel, U.S. Pat. No. 5,723,353 (1998) and Nguyen, U.S. Pat. Nos. 6,236,281 (2001), 5,955, 932 (1999), 5,839,062 (1998), 5,491,604 (1996).

BRIEF SUMMARY OF THE INVENTION

A three-dimensional micro-electro-mechanical-systems (MEMS) bending and axial capacitive sensor is described. Two independent comb structures, incorporating suspended crystalline interdigitated fingers, are fabricated simultaneously on a substrate that can displace independently of each other while attached to a substrate undergoing bending or deformation. A change in spacing between the interdigitated fingers outputs a change in capacitance of the sensor and is the primary mode of operation of the device. On the bottom and the end of each comb structure, a glass pad is attached to the comb structure to allow for ample surface area to affix the sensor to the substrate using adhesives. During fabrication, tethers are used to connect each comb structure to maintain equal spacing between the fingers before attachment to the substrate. After attachment, the tethers are broken to allow independent movement of each comb structure.

Advantages of this system allow the sensor to use very low power since the method of actuation is mechanical. This allows the system to be incorporated in implantable and wireless medical device systems that do not require the use of a battery. Fabrication of the device does not require expensive silicon-on-insulator wafers and the sensor can easily be incorporated into current semi-conductor fabrication processes.

BRIEF DESCRIPTION OF THE SEVERAL VIEWS OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

FIG. 5 is the front view of the testing fixture for the MEMS capacitive bending and axial strain sensor.

DETAILED DESCRIPTION OF THE INVENTION

The present invention will now be described more fully with reference to the drawings, in which illustrative embodiments are shown.

Figure 1:
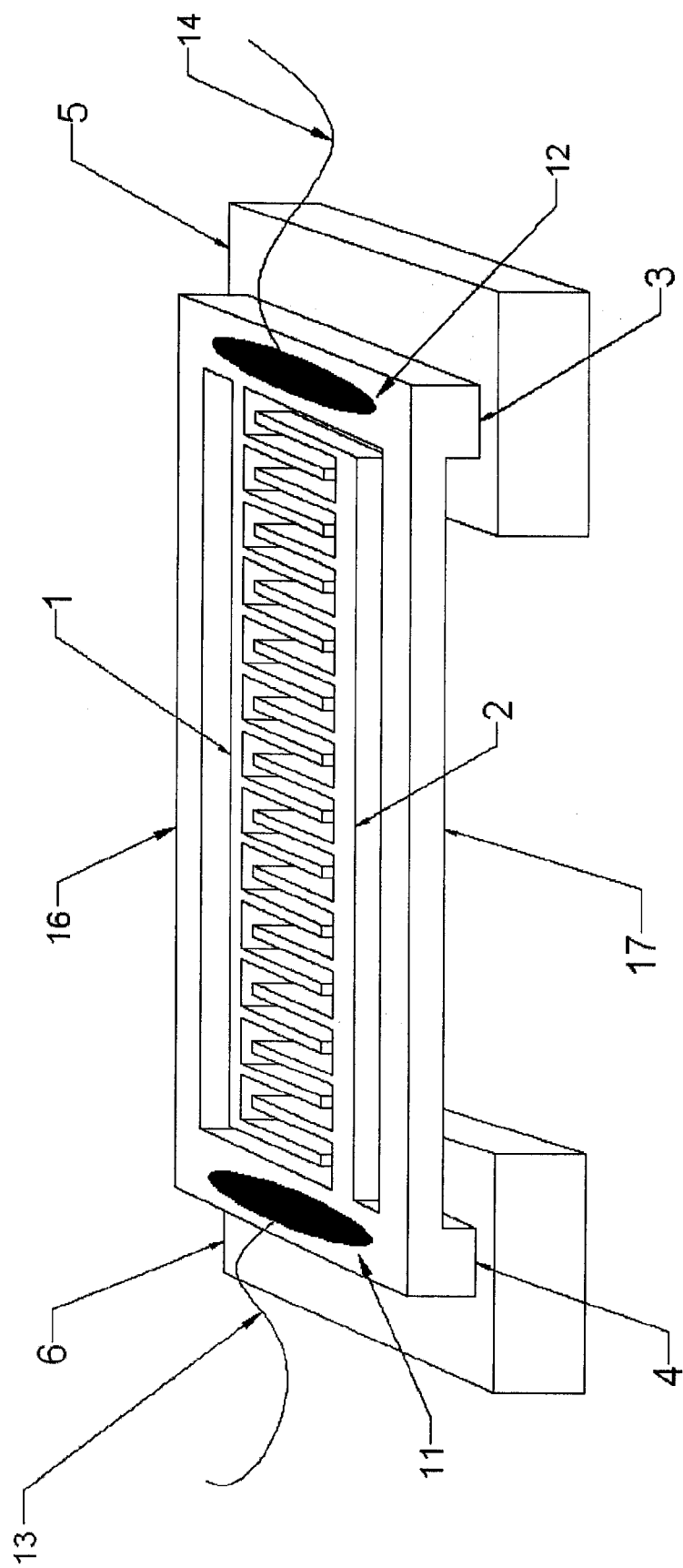
FIG. 1 is a perspective view of the MEMS capacitive bending and axial strain sensor before it is applied to a substrate and the tethers are unbroken.

FIG. 1 is an perspective view of the three-dimensional micro-electromechanical-systems MEMS capacitive bending and axial strain sensor before it is affixed to a flat substrate in which the movable silicon comb structures 1, 2 containing the suspended interdigitated fingers are fabricated using conventional semiconductor fabrication techniques. Each comb structure 1, 2 is elevated by an anchor 3, 4 incorporated at the end the comb structure 1, 2. A glass pad 5, 6 is anodically bonded to the bottom of each anchor 3, 4 to provide electrical isolation from the substrate and to increase the distance from the substrate to the plane of the interdigitated fingers to improve sensitivity. Electrically conductive epoxy 11, 2 is applied to the top of each anchor 3, 4. Electrical leads or wires 13, 14 are placed in the electrically conductive epoxy 11, 12 and the assembly is cured in a heated oven at a specific temperature for an intended period of time. This enables the electrical leads or wires 13, 14 to maintain electrical continuity with the sensor via the electrically conductive epoxy and provides a method to secure the electrical leads to the sensor. Tethers 16, 17 are connected from the end of each comb structure to maintain equal spacing between the interdigitated fingers before application to the substrate.

Figure 2:
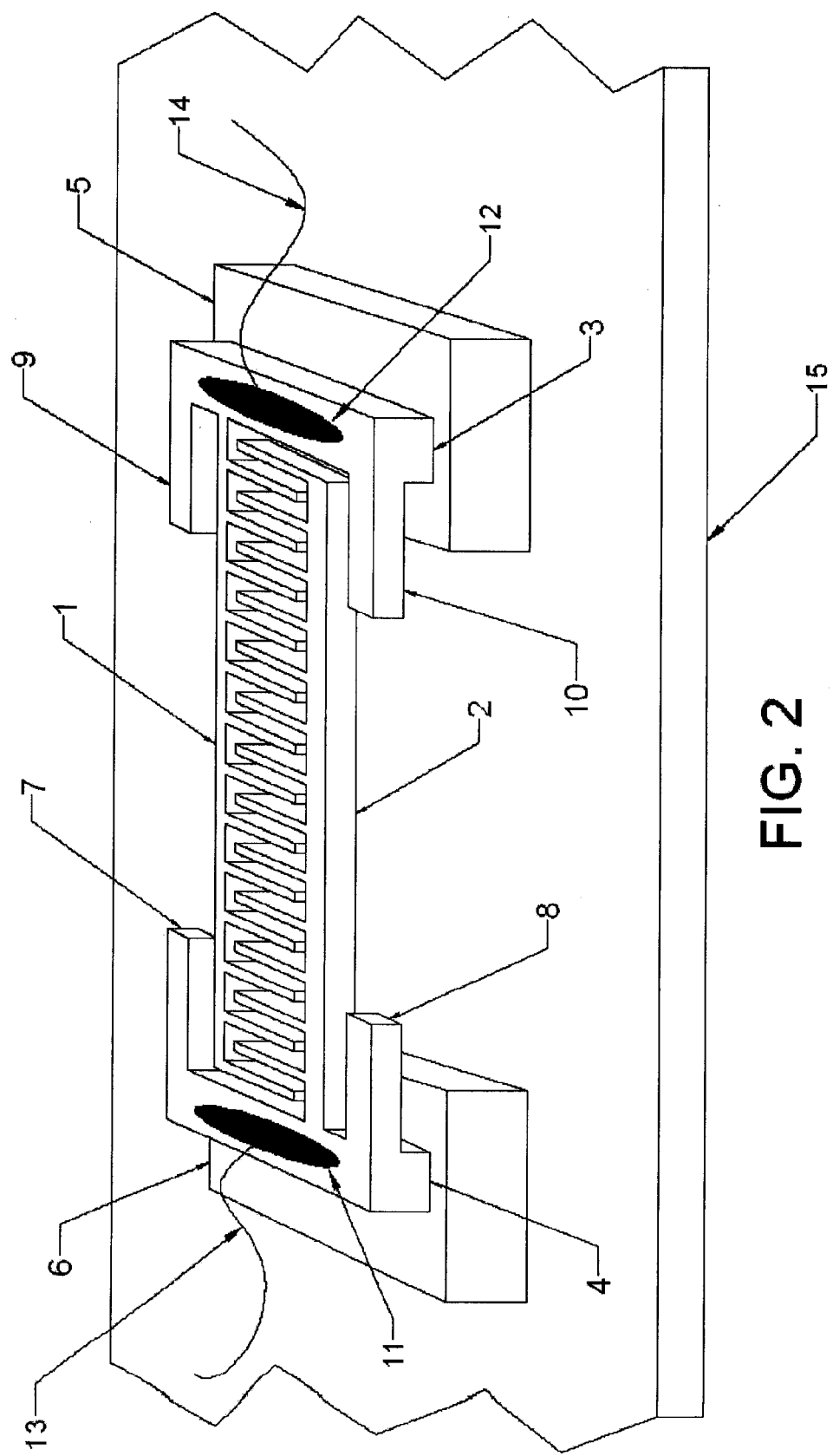
FIG. 2 is a perspective view of the MEMS capacitive bending and axial strain sensor after it is applied to a flat and non-bending substrate with the tethers broken.

FIG. 2 is a perspective view of the three-dimensional micro-electromechanical-systems MEMS capacitive bending and axial strain sensor after it is affixed to a flat substrate 15 and the tethers 7, 8, 9 and 10 have been broken. There is no bending or deformation of the substrate therefore the spacing between each of the fingers is equal on both sides.

Figure 3A:
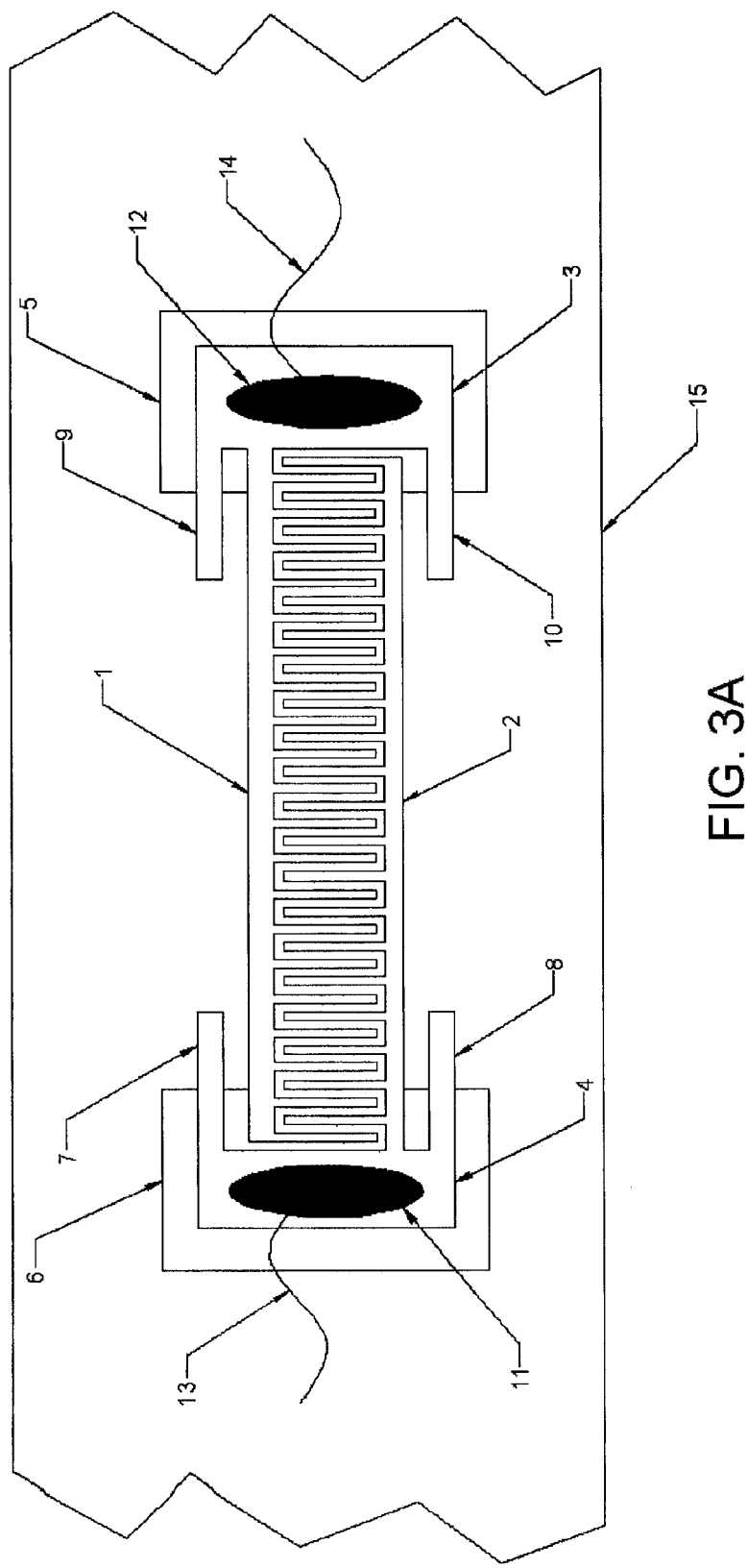
FIG. 3A is a top view of the MEMS capacitive bending and axial strain sensor attached to a flat substrate not undergoing bending or deformation with the tethers broken.

FIG. 3A is a top view of the three-dimensional micro-electromechanical-systems MEMS capacitive bending and axial strain sensor after it is affixed to a flat substrate 15 and the tethers 7, 8, 9 and 10 have been broken.

Figure 3B:
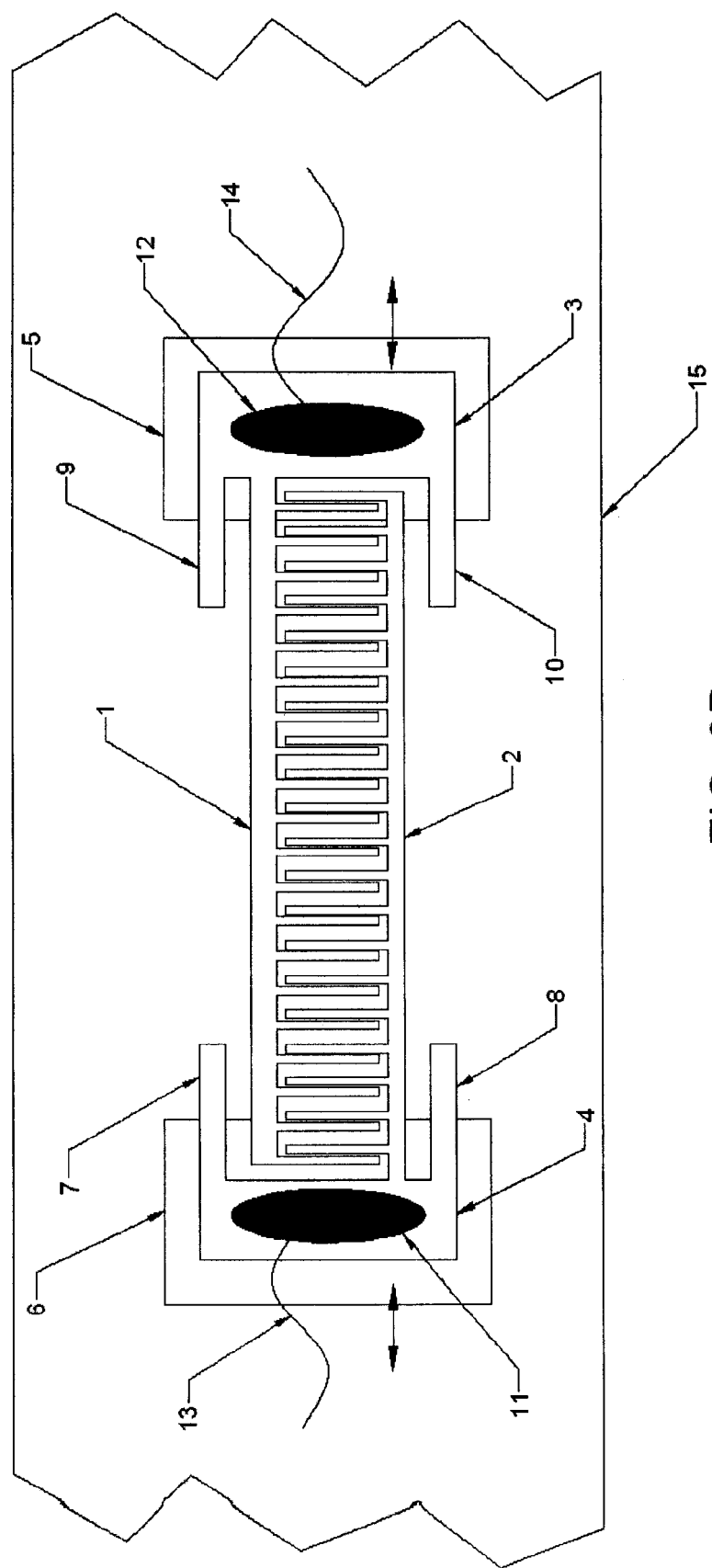
FIG. 3B is a top view of the MEMS capacitive bending and axial strain sensor attached to a bending substrate.

FIG. 3B is a top view of the MEMS capacitive bending and axial strain sensor attached to a bending substrate 15. During bending, lateral movement of each comb structure, as depicted by the arrows of movement, will cause the spacing between the interdigitated fingers to change and result in an increase in capacitance. The capacitance relationship for a parallel plate system is given by $$C = \frac{\varepsilon_0 \varepsilon_r A}{d} \quad (1)$$

where C is generated capacitance in farads (F) and $\varepsilon_0$ is the dielectric of free space equal to $8.85 \times 10^{-14}$ F/cm. The second dielectric constant, $\varepsilon_r$, is the relative permittivity for the medium, which is dimensionless, between the two plates and is equal to 1 for air. The overlapping area between the two plates is A and d is the distance between the two plates. From this relationship, increasing or decreasing the overlapping area of the plates will produce a linear difference in capacitance, whereas, adjusting the spacing between the two plates generates an inverse response.

Figure 3C:
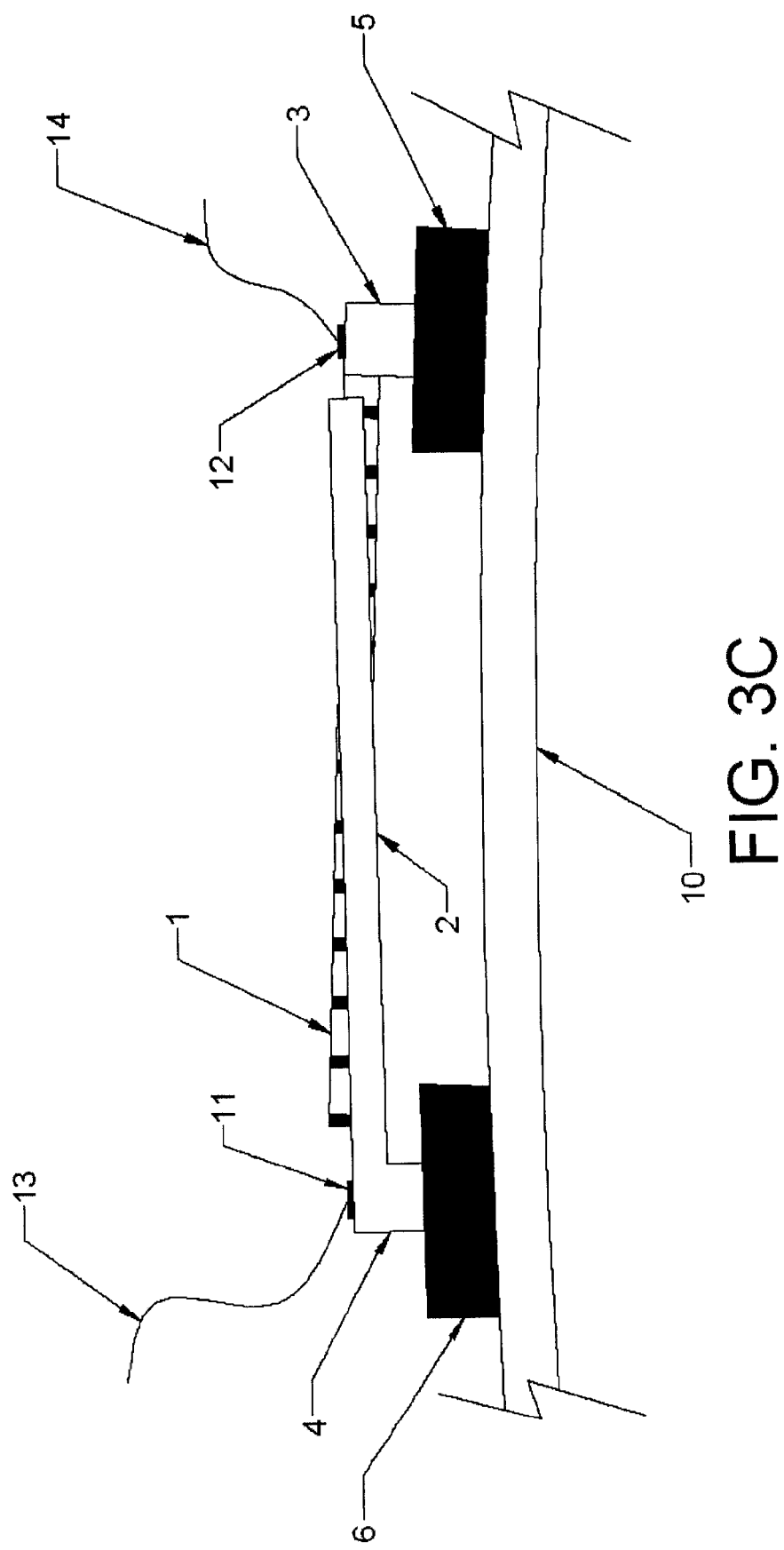
FIG. 3C is a side view of the MEMS capacitive bending and axial strain sensor attached to a bending substrate.

FIG. 3C is a side view of the MEMS capacitive bending and axial strain sensor to a bending substrate. The shape of the bending substrate results in a vertical displacement of the comb structures, which reduces the amount of capacitance due to a reduction of the overlapping surface area between the interdigitated fingers, as supported by Equation (1).

Figure 4:
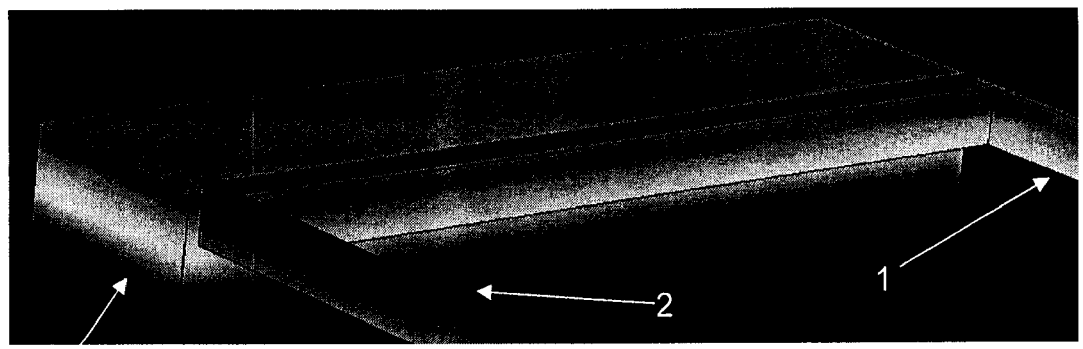
FIG. 4 is a perspective view of finite element modeling results of the displacement of the MEMS capacitive bending and axial strain sensor.

FIG. 4 is a perspective view of the finite element modeling results of one end of the MEMS capacitive bending and axial strain sensor. The model was simplified by showing only the vertical and axial displacement of one pair of interdigitated fingers in the comb structures 1, 2 to verify generated capacitance from calculations.

FIG. 5 is a front illustration of the testing fixture to verify the capacitance output of the fabricated MEMS capacitive bending and axial strain sensor. The testing fixture 16 applies loads to the substrate 15 to induce bending on the substrate and to the attached MEMS capacitive bending and axial strain sensor.

Figure 6A:
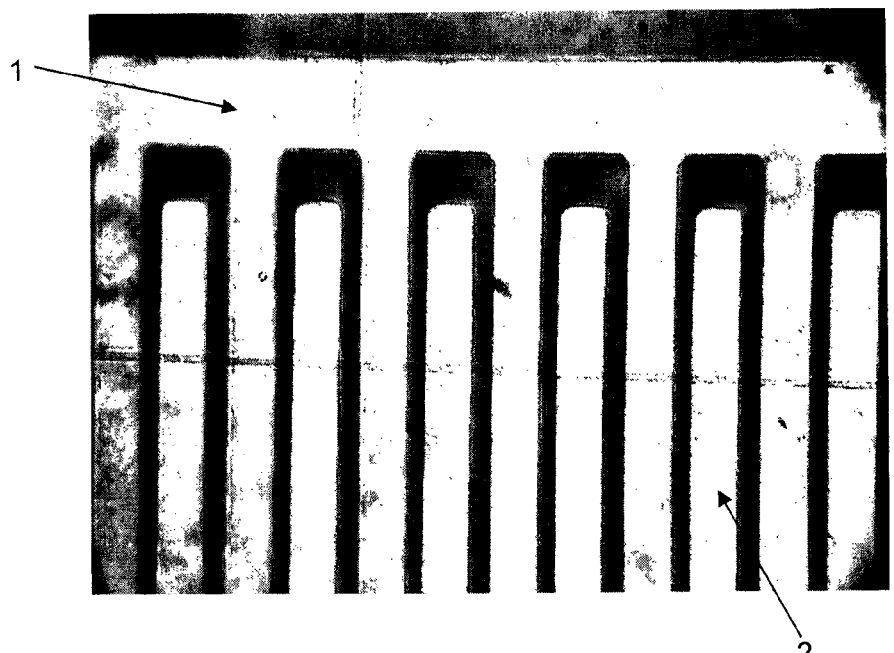
FIG. 6A is a top view of the interdigitated fingers of the fabricated MEMS capacitive bending and axial strain sensor in the static position without undergoing bending.

FIG. 6A is a top view of the interdigitated fingers of the comb structures 1, 2 of the MEMS capacitive bending and axial strain sensor in the static conditions or not undergoing any axial or bending strain.

Figure 6B:
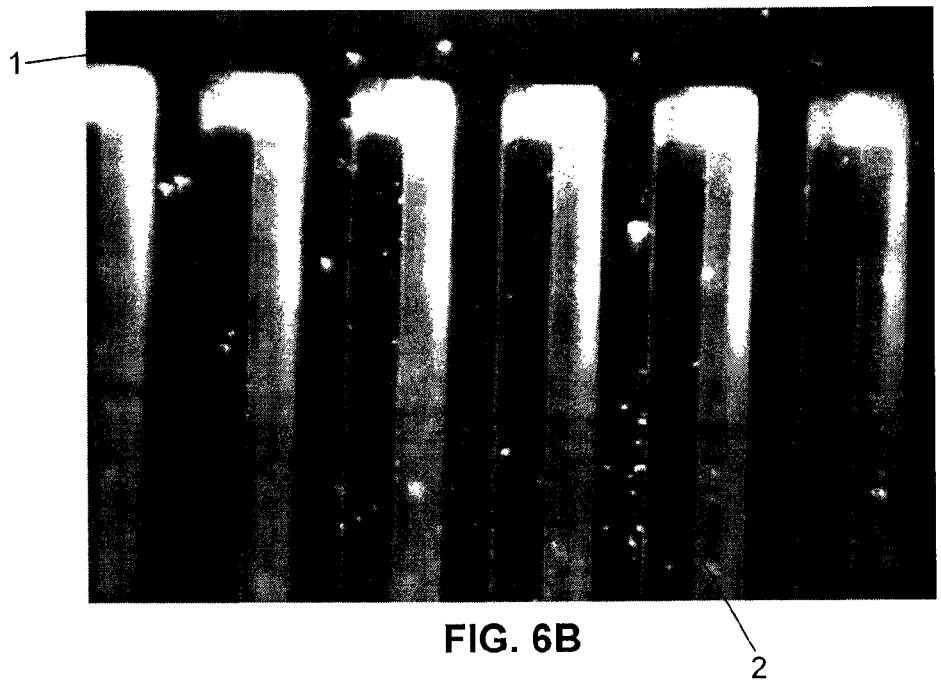
FIG. 6B is a top view of the displaced interdigitated fingers of the fabricated MEMS capacitive bending and axial strain sensor while undergoing bending.

FIG. 6B is a top view of the interdigitated fingers 1, 2 of the MEMS capacitive bending and axial strain sensor undergoing bending in the testing fixture from FIG. 5. A comparison of FIGS. 6A to 6B demonstrates movement of the interdigitated fingers in the comb structures 1, 2, which result in a change in capacitance.

Figure 6C:
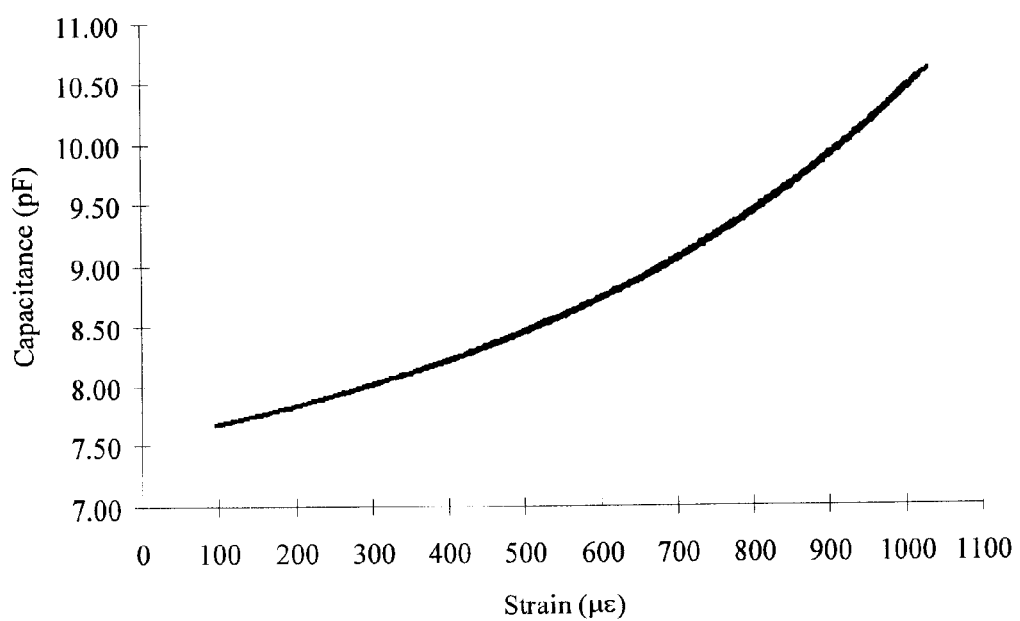
FIG. 6C is the capacitive output of the sensor while undergoing bending in the testing fixture.

FIG. 6C is a graphical illustration of the capacitance output of the MEMS capacitive bending and axial strain sensor while undergoing bending on the substrate 15 in the testing fixture 16.

By virtue of the present invention, a MEMS variable capacitor utilizes multi-fingered interdigitated three dimensional comb structures to sense changes in strain or deformation of the attached substrate. The mechanical method of actuation on a bending or axially deforming substrate provides certain advantages. A change in the capacitance output of the device does not require a high voltage input to change the spacing and overlapping area of the interdigitated fingers, which delivers a change in capacitance.

As a result of the mechanical actuation of the device, relatively small power inputs, as compared to the prior art, are required to monitor capacitive changes for an implantable medical device. This situation allows for a system that does not require a battery, which would have to be recharged, monitored for leaks and eventually removed from the body.

A further aspect of the device allows the use of tethers to maintain alignment of the comb structures until application to a substrate. This also allows for ease of shipping of the device to system manufacturers and placement onto a substrate when desired by the manufacturer.

An additional aspect of this device is fabrication of the device in a way which does not require the use of expensive silicon-on-insulator (SOI) wafers to fabricate the comb structures with the inherent interdigitated fingers. The device can be easily incorporated into current semiconductor fabrication processes.

Another advantage of this device is that the number of interdigitated fingers of the comb structures, their dimensions and the spacing between them can be predetermined to define initial capacitance and sensitivity requirements.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While the present invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art.

What is claimed is:

1. A micro electro-mechanical system (MEMS) capacitive strain sensor, comprising:
    (a) a first comb structure, wherein the first comb structure comprises:
        (i) an anchored end,
        (ii) a free end, and
        (iii) a first plurality of spaced apart members located between the anchored end and the free end;
    (b) a second comb structure, wherein the second comb structure comprises:
        (i) an anchored end,
        (ii) a free end, and
        (iii) a second plurality of spaced apart members located between the anchored end and the free end, wherein the first and second pluralities of spaced apart members are arranged such that the first and second comb structures together form a capacitor to provide a capacitance value; and
    (c) a substrate, wherein the substrate defines a first plane wherein the anchored end of the first comb structure and the anchored end of the second comb structure are mounted to the substrate such that the free ends of the first and second comb structures are movable independently relative to each other;
    wherein the first and second comb structures are configured move with the substrate and along second plane that is parallel to the first plane to provide a change in the capacitance value in response to one or both of axial strain or bending strain on the substrate;
    wherein the first and second comb structures are configured to move relative to the substrate and along a third plane that is not parallel to the first plane to provide a change in the capacitance value in response to bending strain on the substrate.

2. The MEMS capacitive strain sensor as recited in claim 1, wherein the free end of the first comb structure is positioned proximate to the anchored end of the second comb structure, wherein the free end of the second comb structure is positioned proximate to the anchored end of the first comb structure.

3. The MEMS capacitive strain sensor as recited in claim 1, further comprising:
    (a) a first pad positioned between the anchored end of the first comb structure and the substrate, wherein the first pad elevates the first comb structure over the substrate; and
    (b) a second pad positioned between the anchored end of the second comb structure and the substrate, wherein the second pad elevates the second comb structure over the substrate.

4. A micro electro-mechanical system (MEMS) capacitive strain sensor, comprising:
    (a) a substrate, wherein the substrate defines a first plane; and
    (b) a dual comb structure having a first end and a second end, wherein the second end is opposite to the first end, wherein the dual comb structure defines a second plane, wherein the second plane is parallel to the first plane, wherein the dual comb structure comprises:
        (i) a first comb structure, wherein the first comb structure comprises:
            (A) a first set of fingers, and
            (B) a first anchor portion located at the first end of the dual comb structure, wherein the first anchor portion secures the first comb structure to the substrate, and
        (ii) a second comb structure, wherein the second comb structure comprises:
            (A) a second set of fingers, wherein the first and second comb structures are arranged such that the first set of fingers and the second set of fingers are interdigitated, wherein the interdigitated fingers form a capacitor configured to provide a capacitance value, and
            (B) a second anchor portion located at the second end of the dual comb structure, wherein the second anchor portion secures the second comb structure to the substrate,
        wherein the first and second comb structures are configured such that the spacing between the interdigitated fingers changes in response to one or both of axial strain or bending strain in the substrate to provide a change in the capacitance value in response to one or both of axial strain or bending strain in the substrate;

wherein the first and second comb structures are configured such that the first comb structure and the second comb structure are movable along the second plane to change the spacing between the interdigitated fingers in response to one or both of axial strain or bending strain in the substrate;

wherein the first and second comb structures are configured such that the first comb structure and the second comb structure are movable along a third plane to change the spacing between the interdigitated fingers in response to bending strain in the substrate, wherein the third plane is perpendicular to the first and second planes.

5. The MEMS capacitive strain sensor as recited in claim 4, wherein the first comb structure further comprises a first free end opposite to the first anchor portion, wherein the first free end is positioned at the second end of the dual comb structure, wherein the second comb structure further comprises a second free end opposite to the second anchor portion, wherein the second free end is positioned at the first end of the dual comb structure, such that the first comb structure is configured to move relative to the substrate in a manner independent from movement of the second comb structure relative to the substrate.

* * * * *